Jan. 15, 1929.  1,699,155

H. W. MUHLEISEN

BRAKE CONSTRUCTION

Filed Aug. 12, 1925

INVENTOR.
HENRY W. MUHLEISEN
BY Fred H Hayn.
ATTORNEY.

Patented Jan. 15, 1929.

1,699,155

UNITED STATES PATENT OFFICE.

HENRY W. MUHLEISEN, OF LOS ANGELES, CALIFORNIA.

BRAKE CONSTRUCTION.

Application filed August 12, 1925. Serial No. 49,715.

My invention relates to brake constructions, and more particularly to those associated with motor cars or other vehicles, whereby said cars and vehicles may efficiently and quickly be brought to a standstill with minimum wear, and without the tendency to "chatter" when brake application is made.

It accordingly is an object of my invention to provide a novel form of brake construction in which a set of brake shoes, preferably substantially semi-circular in form, and equipped exteriorly with friction material, are caused to be expanded in the arc of a true circumference of a larger diameter than said shoes previously occupied, by means of a floating and self-centering mechanism comprising a set of overlapping levers, one end of each being detachably associated with said brake shoes, while the other ends are equipped with a set of toggle levers held in resilient relation with each other, and detachably associated with said shoes, said overlapping levers being equipped with means whereby wear thereon may be reduced to a minimum, said means preferably comprising a floating ring construction associated with said overlapping levers and the hub of the brake construction, if such is used.

A further object of my invention is to provide a novel form of brake construction in which the wear due to brake application will be distributed in a uniform manner over the entire area of the friction surfaces, one in which the braking pressures are equalized and statically balanced, said construction being simple in character, easy and inexpensive to construct, thoroughly reliable and efficient in operation, and one which will thoroughly and reliably effect the objects intended.

Further objects and advantages of my invention will become more apparent as the description thereof proceeds.

Figure 1:
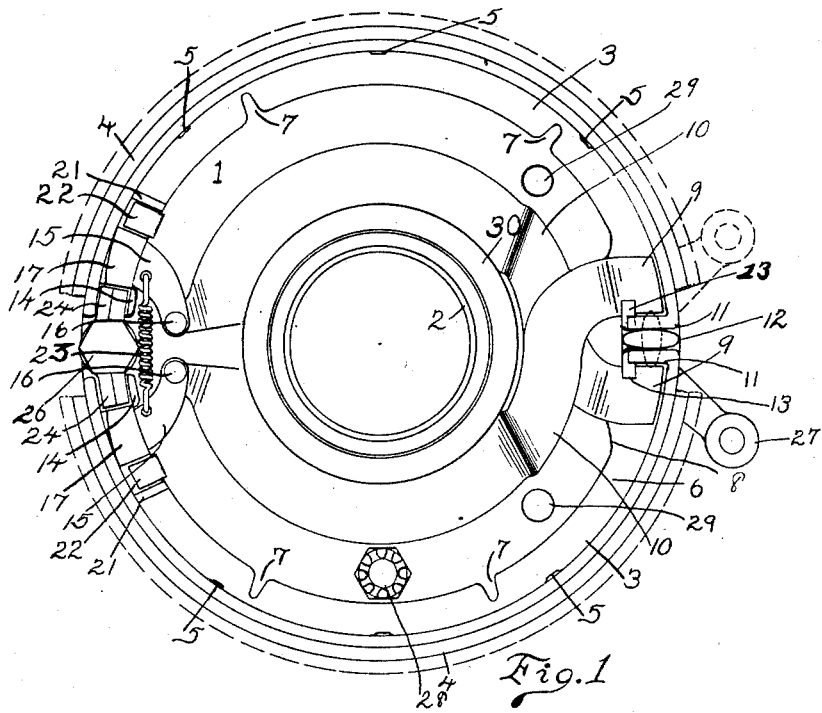
Figures 2, 3:
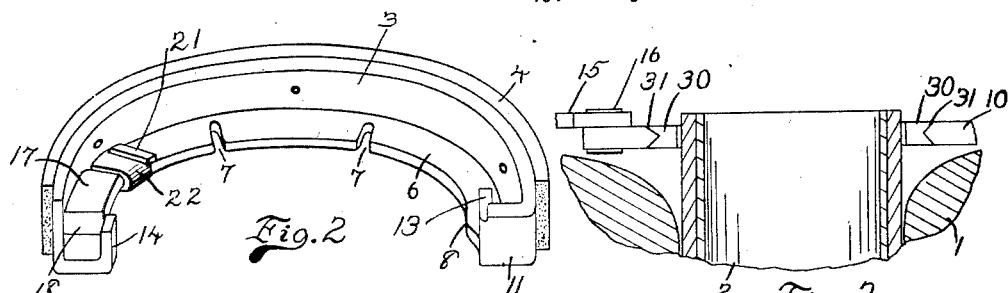
Figures 4, 5:
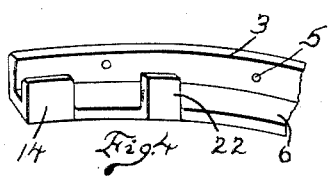
Figure 6:
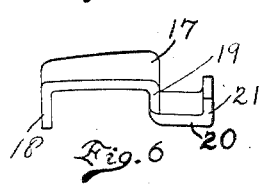

Reference is had to the accompanying drawings, in which similar reference characters denote similar parts. In the drawings, Fig. 1 is an elevational view of my novel form of brake construction associated with one of the axles of a motor vehicle or other conveyance, the usual brake drum being omitted, Fig. 2 is a perspective view of one of the expanding elements or brake shoes, showing the lever holding means in position, Fig. 3 is a fragmentary cross sectional detail view showing the manner in which the floating ring is associated with the hub, if such is used, Fig. 4 is a fragmentary detail view of one of the brake shoes or expanding elements, showing said shoe in its condition before the holding device for the toggle lever is secured in position, Fig. 5 is a perspective detail view of the swivel member, and Fig. 6 is a similar view of one of the toggle lever holding devices.

Describing my invention more in detail, the numeral 1 indicates the terminal plate or flange of a conventional form of brake construction, said plate being associated with a hub 2 of the axle housing, said housing being in practise provided with the usual dust cap, washers, etc. It will be obvious also that my invention may be applied to other conventional forms of brake constructions in which the hub 2 is omitted.

Positioned on the plate 1, and under certain conditions in floating relation therewith, is a set of brake shoes or expanding elements or members 3, in the drawings being illustrated as two in number, and substantially semi-circular in shape. Said shoes are equipped exteriorly with a layer of frictional material 4 secured to said shoes by any suitable fastening means as for example rivets 5, said shoes being in the form of arcuate angle irons having flanges 6 equipped with cut-away portions 7, which cut-away portions permit said brake shoes to be expanded uniformly to provide for a uniform and even brake surface pressure. Of course, it will be clear that this construction in practise may be varied, and that brake shoes of other form and material may be provided.

The brake shoes 3 have their internally extending flanges 6 positioned upon the plate 1 of the brake housing, and are adapted to float thereon at all times, except when locked, as hereinafter more particularly explained.

As shown more particularly in Fig. 2, one end of each flange 6 is widened, as indicated at 8, to form a bearing surface for the ends 9 of a pair of overlapping levers 10, formed as shown in Fig. 1, portions of said levers embracing and being positioned in concentric relation with the hub 2.

As previously stated, the hub 2 may be omitted, if desired, depending upon the particular make of the vehicle or the apparatus with which my device is to be associated.

To hold the ends 9 of the levers 10 securely in position, and in detachable relation with the brake shoes, said brake shoes are equipped with inturned ends 11 forming bearing surfaces for a cam or other member 12, hereinafter more particularly to be described. The inturned ends 11 are equipped with bent portions 13 defined by cutting away the metal so that the ends 9 of the levers 10 may be positioned thereunder and securely held in such position.

The other ends of the brake shoes 3 are equipped with upturned flanges 14 being of course arcuate in form and corresponding to the contour of said brake shoes. It will be understood however that this is immaterial, since said flanges may take any form in practice found desirable. The purpose of these flanges will presently be explained.

Associated with the levers 10 at their juxtaposed ends is a pair of toggle levers 15 secured to the levers 10 by means of suitable pins or other members 16, the outer ends of the toggle levers 15 being positioned on the flanges 6 of the brake shoes 3, and held in detachable relation therewith by means of the devices 17, shown more particularly in Fig. 6. Said devices are arcuate in form, and are right or left handed, depending on the particular brake shoe with which it is associated. Said devices 17 are equipped with a bent portion 18 and another bent portion 19, which portion 19 is provided with an extension 20 having an upstanding flange 21.

The devices 17 are positioned on the flanges 6, as shown in Figs. 1 and 2, and the flange 22, as more particularly shown in Fig. 2, is bent over the extension 20 so that the device 17 is securely held in position on the flange 6. It will thus be clear that the overlapping levers 10 with the toggle levers 15 are held in detachable relation with the brake shoes 3, and float therewith.

As shown in Fig. 1, the toggle levers 15 are held in constrained relation, resiliently, by a spring means 23, which may in practice be any found desirable, said spring, if desired, being associated with said toggle levers in any preferred manner, as by a pair of hooks taking into suitable holes provided in said toggle levers.

To position the brake shoes or expanding elements 3 on the terminal plate or flange 1 of the axle housing so that said shoes may float thereon, I have provided a construction more particularly shown in Fig. 5, which consists of a pair of swivel arms 24 formed by doubling a preferably flat and rectangular piece of metal upon itself, forming circular hubs 25, the material being cut away, so that one of said hubs may be superimposed upon the other, a stud 26 being positioned therein, which stud is tapped into the terminal plate 1, the arms 24 being held in pivotal relation with said stud. As will be evident from Fig. 1, the brake shoes 3 are held in relatively slidable relation with the swivel arms 24, said arms assuming various angles as the brake shoes are expanded and retracted.

As shown in Fig. 1, the cam 12, which may be of any preferred construction, is equipped with a crank arm 27, which crank arm may be operated by suitable connections with the brake pedal or brake lever or other brake operating means for making brake application. The bolt 28 and the holes 29 shown in this figure form part of a conventional brake construction.

The manner of associating the overlapping levers 10 with the hub 2, if such a hub is used, is more particularly shown in Fig. 3, providing a convenient and efficient construction, and withal a very efficient means for reducing wear to a minimum.

As shown in Fig. 3, the hub 2 has a ring 30 positioned loosely thereabout, which ring may be provided with a V-shaped groove 31, or said groove may be of any other preferred shape, so that a complementary projection on the overlapping levers 10 may take thereinto, said projections and groove serving admirably to reduce wear and friction to a minimum. It will be obvious however that said groove and projections may be omitted, if desired.

The operation of my invention should now be clear. By operating the crank 27 to its dotted position in Fig. 1, the cam 12 will assume the dotted position shown in said figure, the brake shoes 3 being then in their extreme expanded position. The expanding force exerted by the cam 12 on the surfaces 11 is conveyed to the ends 9 of the levers 10, which levers in turn exert a similar expanding force upon the toggle levers 15 against the action of the spring 23, the swivel arms 24 sliding relatively to the brake shoes. It will thus be seen that the forces are statically balanced, and the wear on the friction surfaces will be distributed thereover in a uniform manner.

The overlapping levers 10 and the toggle levers 15, together with the ring 30 and the brake shoes 3 form a floating and self centering construction, said construction floating on the plate 1, there being no connection whatever with the hub 2, as hereinbefore explained. Moreover, so long as the cam 12 is in the full line position shown in Fig. 1, the brake shoes 3 will be locked. Should the cam member 12 however be moved ever so slightly, the brake shoes 3 and the lever construction as well as the ring 30 associated therewith, will be free to float on the plate 1, the swivel arms 24 assuming an angular relation with said shoes, which shoes will be positioned in the arc of a true circumference concentric with that of the original position of said shoes, but of a larger diameter, the length of said diameter being determined by the arc through which the cam member 12 is rotated, the cutaway portions 7 permitting the brake shoes to be expanded or retracted uniformly thus insuring that a uniform brake pressure is applied to the brake drum, not shown.

While I have thus shown and described my invention with great particularity, it will be clear that the same may be modified throughout a wide range. I therefore do not propose to be limited to the exact details of construction shown and described, but reserve the right in practice to make any and all modifications thereof that fall within the scope of the appended claims.

I claim as my invention:

1. In a brake construction, in combination, a pair of oppositely movable brake shoes, a swivelled guiding means overlapping one of the adjacent ends of each of said shoes, said brake shoes being provided with means whereby said shoes may be expanded and retracted equally, and means associated with said shoes whereby opposite and diagonal force applications may be applied at each end of each shoe.

2. In a brake construction, in combination, a pair of opposed semi-circular brake shoes, a swivelled guiding means overlapping one of the adjacent ends of each of said shoes, said brake shoes being equipped with means whereby said shoes may be expanded or retracted in an even manner, and means associated with said shoes whereby statically balanced and diagonally and oppositely equalized forces may be coincidently applied at each end of each shoe.

3. In a brake construction, in combination, a pair of opposed semi-circular brake shoes, said shoes being provided with means whereby said shoes may be expanded or retracted in an even manner, means associated with said shoes whereby substantially parallel forces, statically balanced, and equalized diagonally and oppositely, may be coincidently applied at each end of each shoe, and means associated with said shoes whereby their position may be substantially fixed angularly and laterally with respect to their direction of motion.

4. In combination with an axle housing having a flanged end, a brake construction associated with said end, a pair of oppositely movable brake shoes associated with said brake construction, said brake shoes being angularly positioned on said flanged end, said brake shoes being equipped with means whereby said shoes may be expanded or retracted evenly, and means associated with said shoes whereby forces, equalized diagonally and oppositely, may be coincidently applied at each end of each shoe.

5. In combination with an axle housing having a flanged end and a central hub projecting therefrom, a brake construction comprising a pair of oppositely movable brake shoes, said shoes being angularly positioned on said flanged end, said shoes being equipped with means whereby said shoes may be evenly expanded or retracted, and means associated with said shoes whereby forces, equalized diagonally and oppositely, may be coincidently applied at each end of each shoe.

6. In combination with an axle housing having a flanged end and a central hub projecting therefrom, a brake construction associated with said end, said brake construction comprising a pair of oppositely movable brake shoes, angularly positioned on said end, said shoes being equipped with means whereby they may be expanded or retracted evenly, a ring about said hub, a pair of levers centrally fulcrumed on said ring, means associated with said levers for terminally engaging diagonally opposite ends of said shoes, and means associated with said levers functioning to cause said levers to be moved in opposite directions to expand and retract said shoes.

7. A brake construction comprising a set of sections equipped exteriorly with friction material, and a set of relatively rotary, oscillating and sliding elements concentrically positioned relative to said sections so that when at least one of said elements is manually operated, said remaining elements will function to cause said sections to assume a true circle of larger diameter than said sections previously occupied, the active portions of certain of said elements being positioned between the ends of said sections substantially as described.

8. In a brake construction, in combination, a set of semi-circular brake shoes, a pair of overlapped levers each having one end detachably associated with one end of two of said shoes, a toggle lever associated with each of the other ends of said levers and detachably associated with the other ends of the two shoes, a resilient member holding said toggle levers in constrained relation, and means positioned between two ends of said shoes whereby said levers may be caused to expand or retract said brake shoes.

9. In a brake construction, in combination, a set of brake shoes, a pair of overlapping levers having one end of each detachably associated with two juxtaposed ends of two of said shoes, a toggle lever associated with each of the other ends of said levers, a resilient means for holding said toggle levers in constrained relation, and detachable means associated with said brake shoes and said toggle levers for holding said toggle levers in detachable relation with said brake shoes.

10. In a brake construction, in combination, a central hub, a grooved ring associated with said hub, a set of brake shoes concentrically arranged with respect to said hub and said ring, and means associated with said said ring and said shoes for expanding and retracting said shoes.

11. In a brake construction, in combination, a set of flanged semi-circular brake shoes, a set of overlapped levers associated with said brake shoes, a set of toggle levers associated with said overlapped levers and said brake shoes, a holding member secured to the flanges of said shoes for holding said toggle levers in detachable relation with said brake shoes, means for holding said toggle levers in resilient relation, and means associated with said brake shoes functioning to cause said levers to expand or retract said brake shoes.

12. In a device of the class described, in combination, a set of semi-circular members, a floating construction associated with said members, and rotary means associated with said members whereby said members may be caused to float with said floating construction, substantially as described.

13. In a device of the class described, in combination, a pair of substantially semi-circular members, and oscillating and sliding means positioned between the ends of said members whereby said members may be expanded to assume a true circumference of a larger diameter than said members occupied before expansion, said members being equipped with cut out portions of substantially equal size for insuring such expansion, substantially as described.

14. A brake construction wherein one or more pairs of substantially semi-circular brake shoes are adapted to be expanded or retracted at all times in arcs of true circumferences by means of a set of relatively rotatable, sliding, and oscillating members, the active portions of certain of said members being positioned directly between the ends of said shoes, substantially as described.

15. In a brake construction, in combination, a set of semicircular flanged brake shoes equipped with turned-in portions, said flanges being equipped with cut-away portions of substantially equal size, which portions function to permit said shoes to be expanded or retracted at all times in arcs of a true circumference, shoe engaging means abutting at least two of said turned-in portions, internally of said shoes, and means positioned between the ends of said shoes whereby said shoes may be operated simultaneously.

16. In a brake construction, in combination, a set of semi-circular flanged brake shoes equipped with turned-in and bent-up portions on their ends, brake shoe engaging means for abutting said turned-in portions and for engaging said bent-up portions for operating said shoes, and means for operating said brake shoe engaging means, substantially as described.

17. In a brake construction, in combination, an axle housing, a set of brake shoes equipped with cut-away portions of substantially equal size positioned on said housing, and sets of appliances floating about within said brake shoes whereby said shoes may at will be centered with respect to said housing, substantially as described.

18. In a brake construction, in combination, a construction comprising a set of flanged brake shoes, the flanges of which are provided with cut-away portions of even size, and means associated with said shoes, which means, when operated, will float concentrically with said shoes on said construction for operating said shoes, substantially as described.

In testimony whereof I have signed my name to this specification.

HENRY W. MUHLEISEN.